United States Patent [19]

Sandré

[11] Patent Number: 6,134,449

[45] Date of Patent: *Oct. 17, 2000

[54] CORDLESS TELECOMMUNICATIONS SYSTEM AND IDENTIFICATION CODE MODIFICATION PROCESS

[75] Inventor: Benoît Sandré, Le Mans, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/973,647

[22] PCT Filed: Apr. 16, 1997

[86] PCT No.: PCT/IB97/00411

§ 371 Date: Dec. 17, 1997

§ 102(e) Date: Dec. 17, 1997

[87] PCT Pub. No.: WO97/40613

PCT Pub. Date: Oct. 30, 1997

[30] Foreign Application Priority Data

Apr. 24, 1996 [FR] France .................................. 96 05144

[51] Int. Cl.[7] .................................................. H04M 11/00
[52] U.S. Cl. .......................... 455/462; 455/410; 455/465
[58] Field of Search ..................................... 455/462, 461, 455/465, 555, 410

[56] References Cited

U.S. PATENT DOCUMENTS

| | | | |
|---|---|---|---|
| 4,794,636 | 12/1988 | Sanglier et al. ......................... | 379/62 |
| 5,097,500 | 3/1992 | Itoh .......................................... | 379/62 |
| 5,109,537 | 4/1992 | Toki ........................................ | 455/410 |
| 5,157,710 | 10/1992 | Itoh ......................................... | 455/462 |
| 5,201,066 | 4/1993 | Kim ......................................... | 455/89 |
| 5,448,764 | 9/1995 | Sondermann et al. .................. | 455/410 |
| 5,457,737 | 10/1995 | Wen ........................................ | 455/410 |
| 5,495,520 | 2/1996 | Kojima .................................... | 455/462 |
| 5,500,888 | 3/1996 | Chiu et al. .............................. | 455/462 |

FOREIGN PATENT DOCUMENTS

| | | | |
|---|---|---|---|
| 2559008 | 2/1985 | France ............................ | H04M 1/72 |
| 2254225A | 9/1992 | United Kingdom . | |

Primary Examiner—Daniel S. Hunter
Assistant Examiner—Thuan T. Nguyen
Attorney, Agent, or Firm—Dicran Halajian

[57] ABSTRACT

A communication system for communicating between a first device and a second device is disclosed. The first device includes a first processor and a first memory, while the second device includes a second processor a second memory. The processors allow communication between the devices when an identical identification code is stored in both devices. In response to a user command, the first processor replaces an old identification code with a new identification code in a first memory location of the first memory. In response to a request signal from the first device, the second processor replaces the old identification code in a first location of the second memory with the new identification code. In response to an acknowledge signal from the second device, and after verifying that the new identification code is included in the acknowledge signal, the first processor replaces the old identification code in a second memory location of the first memory. Further, the second processor replaces the old identification code in a second location of the second memory with the new identification code after verifying that the new identification code is included in another acknowledge signal from the first device.

11 Claims, 2 Drawing Sheets

CORDLESS TELECOMMUNICATIONS SYSTEM AND IDENTIFICATION CODE MODIFICATION PROCESS

FIELD OF THE INVENTION

The present invention relates to a telecommunications system comprising at least a first unit and a second unit having each:
an identification code,
matching means for matching said identification codes,
means for transmission by radio channel.

The invention also relates to a modification process of modifying identification codes of a first unit and of a second unit of a telecommunications system, said units including means for transmission by radio channel.

The invention also relates to a mobile unit intended to be used in a telecommunications system which includes a base unit with an identification code, said mobile unit having:
an identification code,
matching means for matching said identification code with that of the base unit,
means for transmission by radio channel.

The invention finally relates to a base unit intended to be used in a telecommunications system which includes at least one mobile unit with an identification code, said base unit having:
an identification code,
matching means for matching said identification code with that of said mobile unit,
means for transmission by radio channel.

The invention notably has highly significant applications in the field of cordless telecommunications where it permits of improving the communication security between base unit and mobile unit.

BACKGROUND OF THE INVENTION

French Patent Application No. 2559008 filed by Sony, Jan. 31, 1985, describes a cordless telephone set comprising a base unit and a mobile unit having each an identification code: for a communication to be set up between the base unit and the mobile unit, their identification codes are to match. This patent application describes a mechanism for matching said identification codes by radio channel which requires that the mobile unit is put back on the base unit.

Such a solution has various drawbacks. On the one hand, it necessitates the use of physical detection means for detecting that the mobile unit rests on the base unit, which considerably increases the cost price of the telephone. On the other hand, it does not permit of changing the identification code at an arbitrary instant: the only criterions applicable are of the type "change of identification codes every n time intervals in which the mobile unit rests on the base unit". Finally, this process does not provide total reliability for the user, notably in the case where the user lifts the mobile unit before the base unit has received a clearing from the mobile unit.

SUMMARY OF THE INVENTION

The present invention notably has for its object to propose a telecommunications system which remedies these drawbacks.

Therefore, a telecommunications system according to the invention and as described in the opening paragraph is characterized in that:
said matching means comprise modification means for modifying previously matched codes, operating only by radio channel, for substituting codes called new identification codes for codes called old identification codes,
said modification means comprising verification means for ensuring that said units are correctly matched after such a modification before said old identification codes are deleted.

Thus, according to the invention, the previously matching identification codes of a base unit and a mobile unit may be modified by radio channel at an arbitrary instant, without the necessity of putting the mobile unit back on the base unit. The verification means make it possible to protect the system against radio disturbance or interruptions of power supply, by avoiding that the identification code is modified in only either of the two units, which would result in that the system would be put out of operation.

Moreover, as the identification codes of the mobile unit and base unit are to be matched beforehand, it is impossible to match a pirate mobile unit with the base unit by the mechanism of identification code modification according to the invention.

In an advantageous embodiment, said modification means are utilized on the initiative of said first unit at a request transmitted to said second unit by radio channel.

In another particularly advantageous embodiment, said verification means comprise:
means for transmitting a first acknowledgement from said second unit to said first unit to permit said first unit to verify whether its new identification code has been correctly received by said second unit,
and means for transmitting a second acknowledgement from said first unit to said second unit to permit said second unit to verify whether said first acknowledgement has been correctly received by said first unit.

In a preferred embodiment:
said units each have first and second storage means,
said transmitting means comprise:
in the first unit, frames transmission mean transmitting frames for which carry the identification code contained in its first storage means,
in the second unit, frames transmission mean transmitting frames for which carry the identification code contained in its second storage means,
and said verification means comprise:
in the first unit, writing mean for writing its new identification code in its second storage means before transmitting said request, and in its first storage means upon reception of said first acknowledgement,
in the second unit, writing mean for writing its new identification code in its second storage means upon reception of said request, and in its first storage means upon reception of said second acknowledgement.

Finally, in another embodiment, said transmitting means comprise:
in the first unit, frames transmission means transmitting frames which for carry the identification code contained in its first storage means,
and in the second unit, frames transmission means transmitting frames which for carry the identification code contained in its second storage means.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
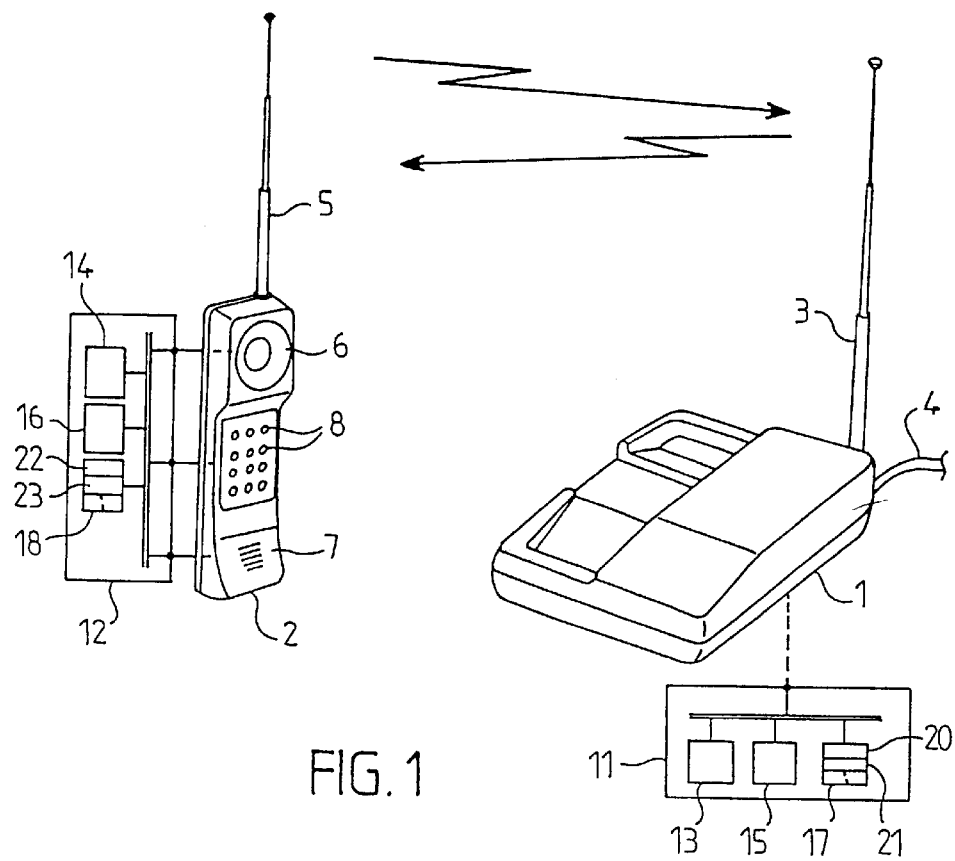
FIG. 1 represents an example of a telecommunications system according to the invention which comprises a mobile unit and a base unit.

As shown in FIG. 1, a telecommunications system according to the invention comprises a base unit 1 and a mobile unit 2. The base unit 1 comprises an antenna and is connected to a telephone terminal by a cable 4. The mobile unit 2 also comprises an antenna 5. The mobile unit has a loudspeaker 6, a microphone 7 and a keypad 8.

Moreover, either of these two units contains a microprocessor set (referenced 11 and 12 respectively, in the Figure) comprising a microprocessor (13 and 14), a random-access memory (15 and 16) and a read only memory (17 and 18) of the EPROM type, for example.

Identification codes permit the base unit 1 and the mobile unit 2 to identify themselves to each other and thus to avoid any pirate use of the line by another mobile unit. This code is transmitted in data frames exchanged between the base unit and the mobile unit. The frames received by a unit are accepted only if the identification code they contain matches that of the receiving unit.

To improve the security of the communications, it is necessary to modify the value of these identification codes regularly. This operation may be effected on the initiative of either unit by the transmission of a request which contains the new value of the identification code. In the following of the description, the unit that takes the initiative for the change is called the first unit and is denoted U1, and the unit that receives the request for modification is called the second unit and is denoted U2. In FIG. 1, the base unit 1 is considered a first unit U1 and the mobile unit 2 is considered the second unit U2. But this example is not restrictive.

In accordance with the invention, two locations 20 and 21, on the one hand, and 22 and 23, on the other hand, are reserved in the read-only memories of the first and second units U1 and U2 for storing the old and new values of the identification codes of either unit.

Figure 2:
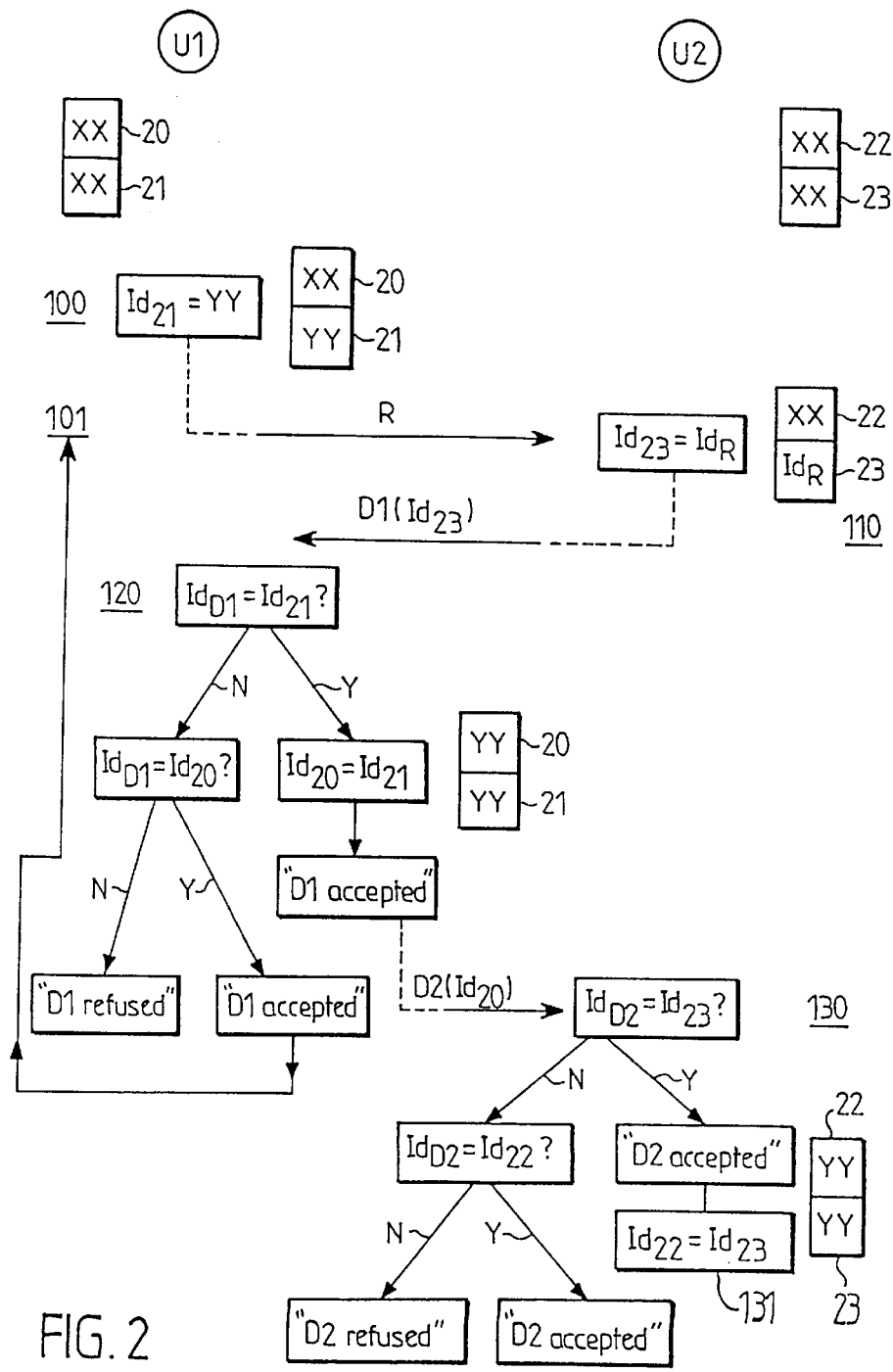
FIG. 2 represents an example of identification code modification process according to the invention, FIG. 3 gives an example of a format of frames exchanged between the base unit and the mobile unit.

The modification process of the identification codes will now be described with reference to FIG. 2. In FIG. 2 is shown in the form of Tables the development of the contents of the four memory locations 20, 21, 22 and 23. In this Table the old and new values of the identification codes are denoted XX and YY, respectively.

In accordance with the invention, the frames transmitted by the first unit U1 contain the identification code which the memory location 20 contains, and the data frames transmitted by the second unit U2 contain the identification code which the memory location 23 contains.

When the system is in normal operation, that is to say, outside the modification steps of the identification codes, the new and old values of the identification odes are the same: value XX is stored in the four locations 20 to 23.

In step 100, the first unit U1 writes the new value YY of the identification code in the memory location 21, and, in step 101, it transmits a request for modification R containing this new value YY to the second unit U2.

In step 110, the second unit U2 receives a request R coming from the first unit U1. It writes the received code which is denoted $Id_R$ in FIG. 2 in its memory location 23.

In step 120, the first unit receives a frame D1 coming from the second unit U2. The identification code $Id_{D1}$ of this frame is equal to the identification code $Id_{23}$ contained in the memory location 23. The first unit verifies whether the value of this code is equal to $Id_{21}$ ($Id_{21}$ being the value that is contained in the memory location 21). If it is, the frame D1 is accepted and processed. Since the request R has been correctly received by the second unit U2, the old value XX of the identification code is deleted in the first unit: therefore, the latter writes the new value YY of the identification code in its memory location 20.

If, on the other hand, the value $Id_{D1}$ contained in the data frame D1 is different from YY, this means that the new value of the identification code has not been correctly received, or has not been taken into account by the second unit U2 due to a radio disturbance or a problem of power supply of the batteries, for example. The first unit U1 examines whether the value of the identification code $Id_{D1}$ is equal to that contained in the memory location 20. If it is, frame D1 is accepted and processed (which is symbolized by the words "D1 accepted" in FIG. 2), after which the process is resumed at step 101. If it is not, frame D1 is refused (which is symbolized by the words "D1 refused" in FIG. 2).

In step 130, the second unit U2 receives a frame D2 coming from the first unit U1. This frame D2 contains the value of the identification code $Id_{20}$ which is contained in the memory location 20. The second unit verifies whether the identification code $Id_{D2}$ contained in this frame is equal to the code $Id_{23}$. This is the case when the value of $Id_{20}$ has been mounted in step 120, that is, when the requested a modification of the identification code has been correctly taken into account by the second unit U2. The second unit U2 accepts and thus processes the received frame D2. And, in step 131, it writes the new value YY of the identification code in memory location 22. The four locations thus contain the new value YY. The modification process is terminated.

On the other hand, if $Id_{D2}$ is different from $Id_{23}$, the second unit verifies whether $Id_{D2}$ is equal to $Id_{22}$. If it is, the frame D2 is accepted and processed by the second unit. If it is not, the frame is refused because the identification code of the unit that has transmitted this frame does not correspond to the old identification code of the second unit.

Thus, the transmission of a frame D1 by the second unit to the first unit forms a first acknowledgement which permits the first unit to verify whether the second unit has correctly written the new value of the identification code.

And the transmission of a frame D2 by the first unit to the second unit forms a second acknowledgement which permits the second unit to verify whether the first unit has correctly received the first clearing.

The old value of the identification code is not deleted in a unit until such a acknowledgement has been received from the side of the other unit.

Figure 3:
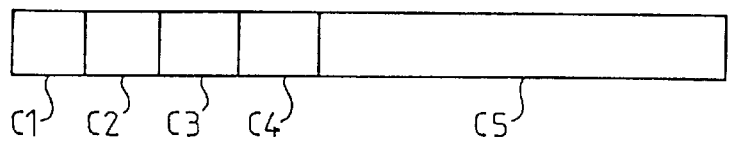

In FIG. 3 is shown by way of example the format of the frames exchanged between the base unit and the mobile unit. Such a frame comprises:
 a synchronization field C1,
 field C2 indicating the length of the frame,
 a field C3 indicating a frame number which permits of knowing whether or not it is a recurrent frame,
 a field C4 which contains an identification code of the unit that transmits the frame,
 a field C5 which contains the data.

When such a frame transports a request R for modification of the identification code, the field C5 contains a code which permits of indicating the respective instruction (modification of the identification code in this case), followed by the new value of the identification code.

Obviously, the invention is not restricted to the preferred embodiment which has just been described.

In this example, there is notably considered that the identification codes of the mobile unit and of the base unit were the same. It is also possible that they are linked by a match relation that differs from the identity.

Moreover, it has been considered that request for modification was transmitted by the base unit. Such a request can be transmitted by either unit.

What is claimed is:

1. A communication system for communicating between a first device and a second device comprising:
    a first memory located in said first device and having a first memory location and a second memory location;
    a second memory located in said second device and having a first memory position;
    a first processor located in said first device; and
    a second processor located in said second device;
    said first processor replacing an old identification code with a new identification code in said first memory location of said first memory in response to a user command, and said second processor replacing said old identification code in said first memory position of said second memory with said new identification code in response to a request signal from said first device;
    wherein said first processor replaces said old identification code in said second memory location of said first memory in response to an acknowledge signal from said second device after verifying that said new identification code is included in said acknowledge signal so that said new identification code is stored in said first memory location and said second memory location of said first memory.

2. The communication system of claim 1, wherein said second processor replaces said old identification code in a second memory position of said second memory with said new identification code after verifying that said new identification code is included in another acknowledge signal from said first device, so that said new identification code is stored in said first memory position and said second memory position of said second memory.

3. A mobile communication unit for communicating with a base station having a current identification code stored in a base memory comprising:
    a unit memory which stores said current identification code in a first memory location and a second memory location; and
    a processor which replaces said current identification code with a new identification code in said first memory location in response to a user command, and replaces said current identification code in a second memory location with said new identification code after verifying that said new identification code is included in an acknowledge signal from said base station so that said new identification code is stored in said first memory location and said second memory location of said unit memory.

4. The mobile communication unit of claim 3, wherein said acknowledge signal is formed after a request signal with said new identification code is received from said mobile communication unit and said new identification code is stored in said base memory.

5. A base station for communicating with a mobile communication unit having a current identification code comprising:
    a memory which stores said current identification code in a first memory location and a second memory location; and
    a processor which replaces said current identification code with a new identification code in said first memory location in response to a request signal having said new identification code from said mobile communication unit, said processor replacing said old identification code in said second location with said new identification code after verifying that said new identification code is included in an acknowledge signal from said mobile communication unit so that said new identification code is stored in said first memory location and said second memory location of said memory.

6. The base station of claim 5, wherein said acknowledge signal is formed in said mobile communication unit after another acknowledge signal with said new identification code is received from said base station.

7. The base station of claim 6, wherein said new identification code is stored in a first memory of said mobile communication unit prior to providing said request signal to said base station and is stored in a second memory of said mobile communication unit after said another acknowledge signal is received from said base station.

8. A method of changing an old identification code stored in a first pair of memory locations of a first device and in a second pair of memory locations of a second device comprising:
    replacing said old identification code in one of said first pair of memory locations with a new identification code in response to a user command;
    replacing said old identification code in one of said second pair of memory locations with said new identification code in response to a request signal from said first device;
    replacing said old identification code in another of said first pair of memory locations with said new identification code after verifying that an acknowledge signal from said second device includes said new identification code so that said new identification code is stored in said first pair of memory locations of said first device.

9. The method of claim 8, further comprising replacing said old identification code in another of said second pair of memory locations with said new identification after verifying that another acknowledge signal from said first device includes said new identification code so that said new identification code is stored in said second pair of memory locations of said second device.

10. A communication system for communicating between a first device and a second device comprising:
    a first memory located in said first device and having a first memory location and a second memory location, said first memory storing a first identification code in said first memory location and in said second memory location;
    a second memory located in said second device and having a first memory position and a second memory position, said second memory storing said first identification code in said first memory position and in said second memory position;
    said first device storing a second identification code in said first memory location and providing a code change request signal to said second device, said code change request signal containing said second identification code stored in said first memory location;
    said second device storing in said first memory position said second identification code contained in said code change request signal and providing said first device a first acknowledge signal containing said second identification code stored in said first memory position;

said first device storing in said second memory location said second identification code contained in said first acknowledge signal if said second identification code contained in said first acknowledge signal matches said second identification code stored in said first memory location so that said second identification code is stored in said first memory location and in said second memory location.

11. The communication system of claim 10, wherein said first device provides said second device a second acknowledge signal containing said second identification code stored in said second memory location; said second device storing in said second memory position said second identification code contained in said second acknowledge signal so that said second identification code is stored in said first memory position and in said second memory position.

* * * * *